T. B. INGRAM.
FERTILIZER DISTRIBUTER.
APPLICATION FILED DEC. 22, 1909.
952,252.
Patented Mar. 15, 1910.
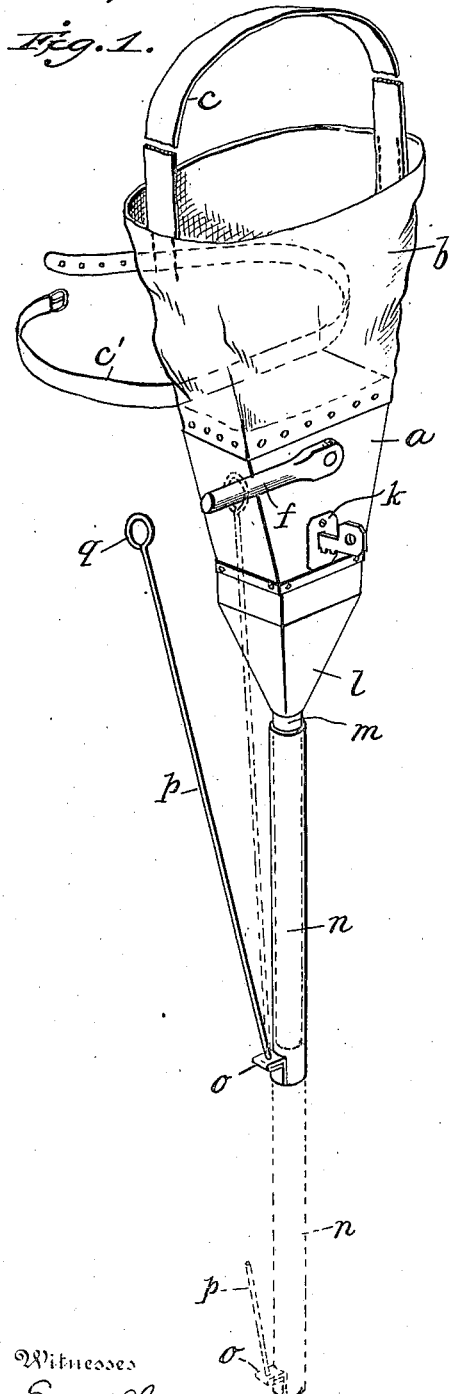
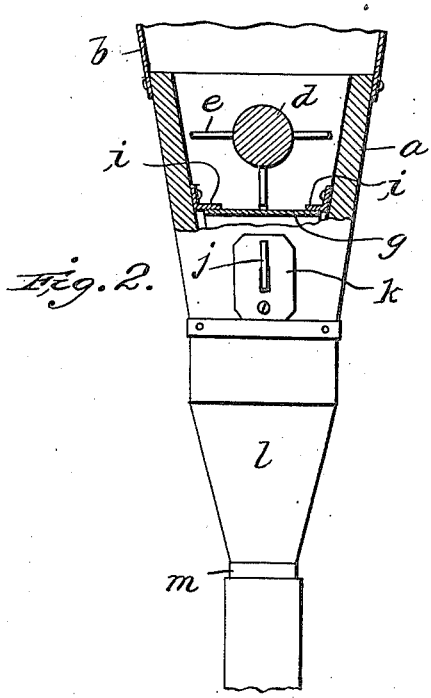
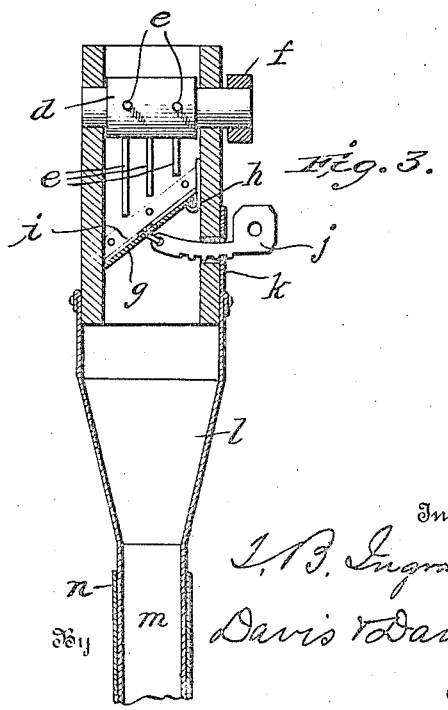

UNITED STATES PATENT OFFICE.

THOMAS B. INGRAM, OF MONTGOMERY, ALABAMA, ASSIGNOR OF ONE-HALF TO WILLIAM J. GARDNER, OF MONTGOMERY, ALABAMA.

FERTILIZER-DISTRIBUTER.

952,252.  Specification of Letters Patent.  Patented Mar. 15, 1910.

Application filed December 22, 1909. Serial No. 534,427.

*To all whom it may concern:*

Be it known that I, THOMAS B. INGRAM, a citizen of the United States, and a resident of Montgomery, in the county of Montgomery and State of Alabama, have invented certain new and useful Improvements in Fertilizer-Distributers, of which the following is a full and clear specification, reference being had to the accompanying drawings, in which—

Figure 1 is a perspective view of my apparatus showing in dotted lines the distributing spout extended; Fig. 2 a view partly in side elevation and partly in section, the section being taken on Fig. 1 at right angles to the line on which Fig. 3 is taken; and Fig. 3 a vertical sectional view taken at right angles to the line on which Fig. 2 is taken.

The object of this invention is to provide a simple and inexpensive hand-implement by which the fertilizer may be deposited in predetermined quantities, the device being easily operated and being inexpensive and durable in construction, as more fully hereinafter set forth.

In the drawings $a$ designates a wooden hopper tapering downwardly, to whose upper edge is attached a flexible bag-like extension $b$ of the hopper. To the upper edge of this hopper $b$ is attached a strap $c$ to engage over the shoulder of the operator, and to the lower edge of this flexible extension of the hopper is attached a body band $c'$ which is adapted to go around the body of the operator in the manner of a belt. Journaled in the wooden part $a$ of the hopper is a shaft $d$ which carries a series of stirrer pins $e$ within the hopper and a lateral operating handle $f$ outside the hopper, which handle projects laterally beyond the side of the hopper $a$. The bottom of the hopper consists of a plate $g$ hinged at $h$ to the horizontal pivot on one of the inner walls of the hopper, the hopper bottom being inclined downwardly from said hinge toward the other side of the hopper. When the bottom of the hopper is closed its side edges bear upwardly against inwardly extending flanges $i$ attached to the opposite walls of the hopper, and the adjustment of the hopper bottom to determine the quantity of fertilizer discharged is secured by a curved rod or bar $j$ pivotally attached to the under side of the hopper bottom and extending outwardly through a hole in one wall of the hopper. The lower edge of this bar $j$ is provided with a series of notches any one of which may be engaged with the lower edge of a hole in a metal catch-plate $k$ fastened to the outside of the hopper, whereby the hopper bottom may be opened and held open at the desired point to determine the quantity of fertilizer discharged.

Attached to and depending from the hopper $a$ is a metal funnel-like extension $l$ of the hopper, whose lower end terminates in a depending cylindrical tube $m$. Surrounding this tube $m$ is another tube $n$ which is slidable thereon. Pivotally attached to a lateral lug or ear $o$ at the lower end of tube $n$ is an upright rod $p$ which is provided with a ring $q$ at its upper end, said rod being long enough to permit the ring $q$ to be engaged over the end of the lever $f$, as shown in dotted lines in Fig. 1 when the tube $n$ is drawn upward to its inoperative position.

In using this apparatus, the operator hangs strap $c$ on his left shoulder and holds the hopper against his person by means of the belt-like band $c'$. As he walks along the row, he slowly works the lever $f$ up and down, which stirs the fertilizer sufficiently to keep it moving in a substantially constant stream downwardly off the edge of the hopper bottom $g$, this bottom first having been adjusted to feed the quantity per acre desired. The operator at the same time holds rod $q$ in his right hand and pushes or lets down spout $n$ to a point near the ground, to enable the fertilizer to be deposited at the point desired on the ground. By being able to freely manipulate the extension by means of the long rod $p$ it will be observed that the operator can readily deposit the fertilizer at the point desired and thereby avoid scattering and wasting it. When the apparatus is not in use, the extensible spout may be locked in its drawn-up position by slipping the ring $q$ onto the projecting end of lever $f$, as shown in dotted lines.

Having thus fully described my invention, what I claim as new and desire to secure by Letters Patent, is—

1. In combination with a hopper and means for attaching it to the body of the operator, a stirrer therein, an operating handle attached to the stirrer exteriorly of the hopper, means for regulating the discharge of the fertilizer, an extensible deposit spout depending from the hopper, a long operating rod attached to the lower end of the extensible part of the spout and provided at its upper end with a ring adapted to engage over said handle.

2. In combination with a hopper and means for attaching it to the person of the operator, a stirring means in the hopper, a bottom plate in the hopper hinged to one side of the interior thereof and extending downwardly in an inclined direction across the hopper, means for adjusting the angular position of the plate to regulate the feed, and means attached to the hopper for depositing the discharged fertilizer.

3. In combination with a hopper and means for attaching it to the person of the operator, of stirring and feeding means within the hopper, means attached to the lower end of the hopper for depositing the fed material said means embodying an extensible spout consisting of telescoping tubes, a rod attached to the lower end of the outer tube and extending upwardly to a point within reach of the operator, whereby the operator may extend and withdraw the sliding outer tube as he walks along the ground.

In testimony whereof I hereunto affix my signature in the presence of two witnesses this 20th day of December 1909.

THOMAS B. INGRAM.

Witnesses:
W. E. ALLEN,
B. F. DAVIDSON.